Sept. 20, 1966  E. WILDHABER  3,273,341
POSITIVE-DISPLACEMENT THERMAL UNIT
Original Filed March 29, 1963  3 Sheets-Sheet 1

INVENTOR:
Ernest Wildhaber
By: /B. Ehlinger/
Attorney

INVENTOR:
Ernest Wildhaber
By: [signature]
Attorney

Sept. 20, 1966 E. WILDHABER 3,273,341
POSITIVE-DISPLACEMENT THERMAL UNIT
Original Filed March 29, 1963 3 Sheets-Sheet 3

INVENTOR:
Ernest Wildhaber
By: B.E.Ahlsinger
Attorney

United States Patent Office 3,273,341
Patented Sept. 20, 1966

3,273,341
POSITIVE-DISPLACEMENT THERMAL UNIT
Ernest Wildhaber, 124 Summit Drive, Rochester, N.Y.
Original application Apr. 29, 1963, Ser. No. 276,285.
Divided and this application Aug. 27, 1965, Ser. No. 483,121
6 Claims. (Cl. 60—39.61)

The present application relates to rotary positive-displacement units. It is a division of my application Serial No. 276,285, filed April 29, 1963, relating to rotor pairs having interengaging lobes or teeth and mounted on intersecting axes.

It relates particularly to units having more than one pair of rotors, where the several pairs interact. One example is a power unit for automotive and similar uses, comprising a compressor, a combustion chamber, and a motor or engine, and wherein one pair of rotors acts as a compressor, and another pair of rotors operates as an engine, and the fluid compressed by the first pair of rotors is conducted to the combustion chamber, and the gases of combustion are then conducted to the second pair of rotors to effect their operation as a motor or engine. The invention is, however, not restricted to such usage since, for instance, one pair of rotors may operate as a cooling unit taking hot air from the outside and delivering it to a cooling unit; and the other pair of rotors will then deliver the stream of cool air to the outside.

One object of this invention is to devise a unit of this kind wherein two rotors of two pairs of rotors are co-axial and rigid with each other.

Another object of the invention is to provide a unit where the two pairs of rotors may be positioned with respect to each other to best advantage.

Another object of the invention is to provide a unit of the character described, in which the compressor and the motor or engine have different volume displacement.

A further object of the invention is to devise a unit containing a rotor pair where at least the opening of the outlet passage is made adjustable.

A related aim of the invention is to provide a unit comprising a compressor, a combustion chamber and a motor or engine, where the compressor and motor each contains a pair of intermeshing rotors, and where the outlet opening of the compressor is adjustable in service.

Other objects of the invention will appear in the course of the specification and in the recital of the claims, particularly when read in connection with the accompanying drawings.

For a better understanding of the invention, the shape of the rotors, and units with single rotor pairs will be described first.

Figure 1:
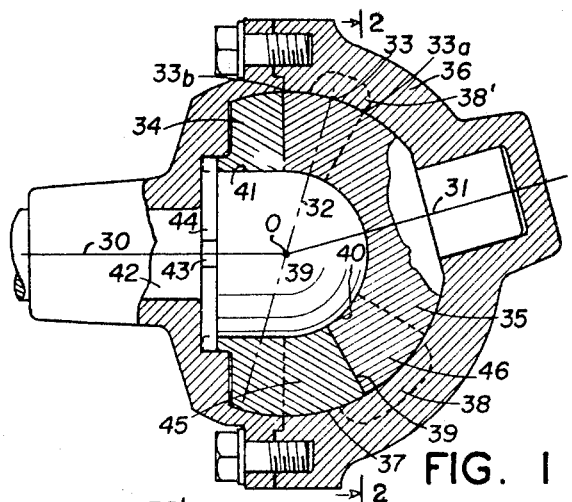
FIG. 1 is an axial section of a unit constructed according to the basic invention.
Figure 2:
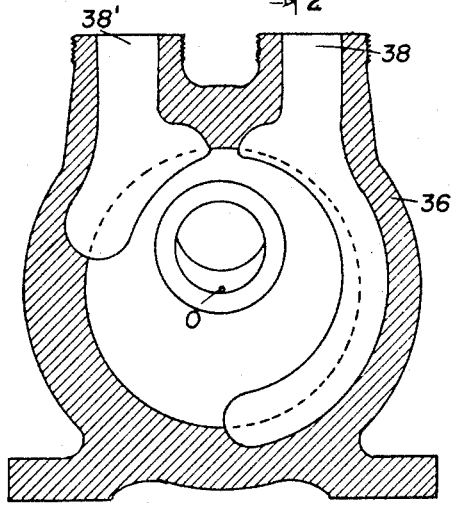
FIG. 2 is a section through the casing of this unit, taken along the line 2—2 of FIG. 1.

The rotors 34, 35 (FIG. 1) have teeth similar to the teeth of bevel gears in that their sides converge radially toward the axes 30, 31 of the respective rotors. The tops of these teeth decrease in height also from their outer to their inner ends. They are rotatably mounted in a housing 36 formed by two parts tightly bolted together. The rotors have convex outer surfaces lying in a common spherical surface 37 that is centered at apex 0 at which the axes 30, 31 intersect. This surface matches a counterpart concave spherical surface provided in housing 36. The counterpart surface serves as a seal and is interrupted by ducts 38, 38'. When FIGS. 1 and 2 illustrate a compressor, the outlet pressure is higher than the inlet pressure and the outlet area is more confined. 38 is the inlet, 38' the outlet for a compressor. On a motor or engine the inlet pressure is higher, and the inlet area is more confined. Looking at FIG. 2, rotation is in clockwise direction for a compressor, in counter-clockwise direction for a motor.

At their inner ends the lobes 45, 46 bear against or match a spherical surface portion 40 also centered at 0. This spherical portion is formed integral with a cylindrical portion 41 and shaft 42. Rotor 34 is made rigid with shaft 42 by lateral projections that engage slots 43 provided on a flange 44 of shaft 42.

Figure 6:
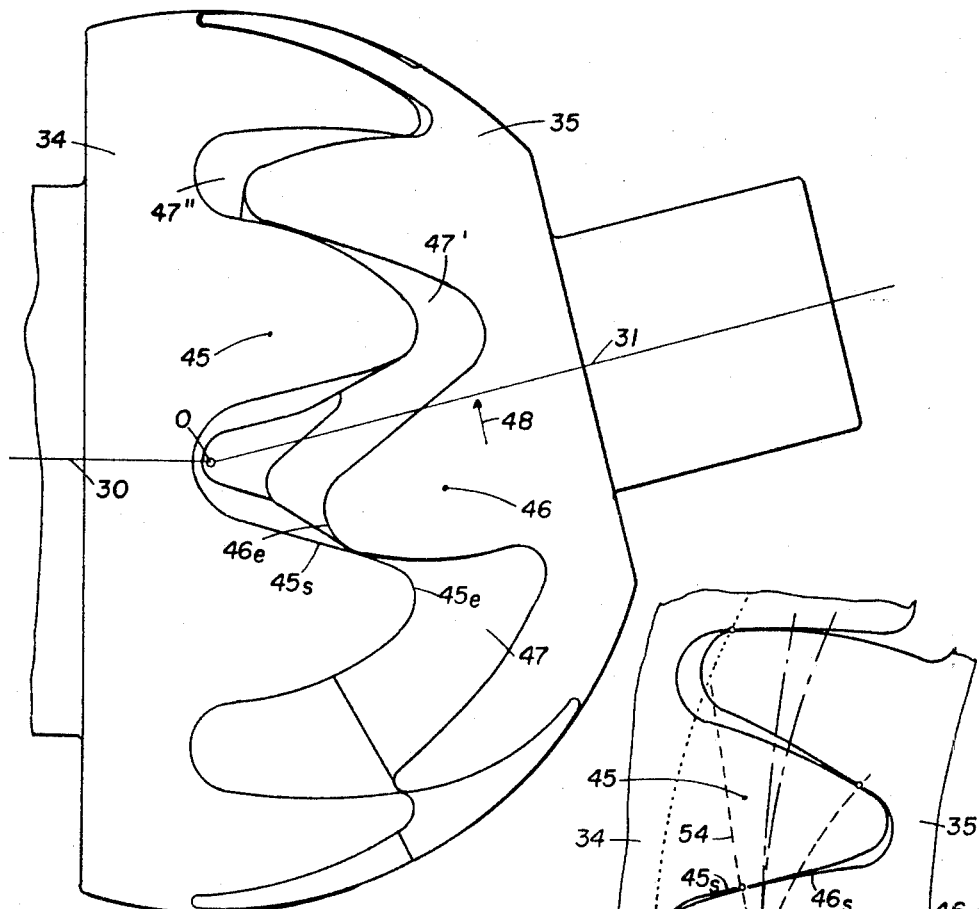
FIG. 6 is an enlarged view of the rotors shown in FIG. 1, looking at right angles at the plane of their axes.
Figure 8:
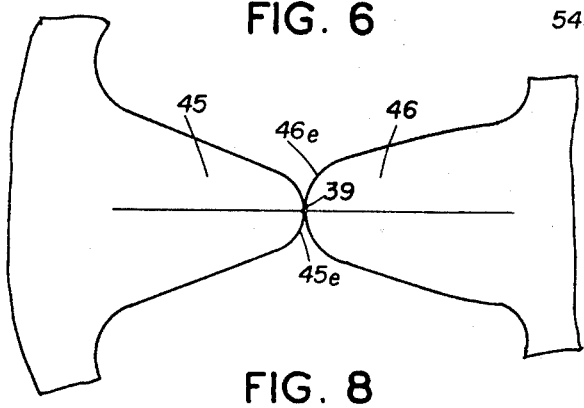
FIG. 8 is a fragmentary view looking along the line of contact of the lobe ends, taken along line 39 of FIG. 1.
Figure 7:
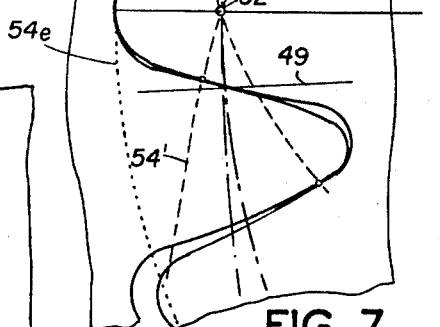
FIG. 7 is a fragmentary view thereof taken in the direction of the instantaneous axis (32 in FIG. 1) and showing the fully engaged lobes.

FIGS. 6 to 8 afford enlarged views of the rotors 34, 35. Their interengaging lobes 45, 46 form pockets 47, 47', 47", ... of changing volume. When rotation is in the direction of arrow 48 the pockets diminish in volume. On a compressor the outlet area starts in a region where the volume has been substantially decreased.

In the position shown in FIG. 6, the side surfaces $45_s$ contact the end surfaces $46_e$ of rotor 35. In the position shown in FIG. 7 contact is between the lobe sides $45_s$, $46_s$ of the rotors.

54 (FIG. 7) is the path of contact between the lobe sides $45_s$, $46_s$. 54' is the path of contact for the opposite lobe sides. It is seen that the duration of contact obtained with path 54 is larger than one full pitch, as the lobes are relatively deep. Always at least one pair of lobes contact with their side profiles, on each of the two opposite lobe sides. Because of the moderate relative curvature of the side profiles a considerable load can be carried at all times, even under adverse conditions of lubrication, or with lubrication by gaseous fluid only.

Dotted line $54_e$ is the path of contact of the lobe ends $46_e$.

$33–33_a$, FIG. 1, is the lobe addendum of rotor 34; and $33–33_b$ is the lobe dedendum thereof. While the addendum is smaller than the dedendum in the example illustrated, it may also be made larger than the dedendum in many cases.

For further details and modifications of the lobe shape see the aforementioned application.

In the embodiment of FIGS. 1 and 2 the outlet opening and the inlet opening are both provided adjacent the outer ends of the rotor lobes, at the spherical surface 37.

Figure 3:
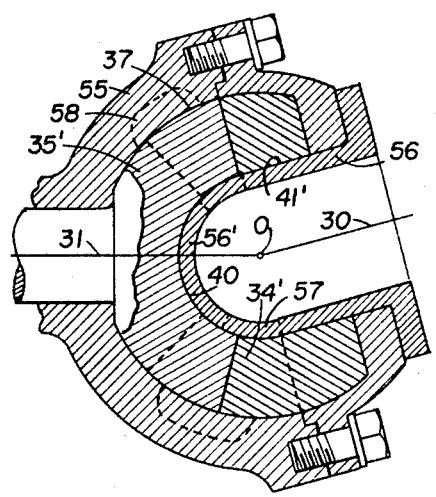
FIG. 3 is an axial section of a modified unit.

FIG. 3 illustrates an embodiment with an inlet opening at the inner spherical surface 40 and an outlet opening at the outer spherical surface 37. The rotors 34', 35' are rotatably mounted on their axes 30, 31 in a housing 55 to which is rigidly secured a tubular member 56 with rounded end 56'. This end contains the described inner spherical surface portion 40 on its outside and an adjacent cylindrical surface portion 41' which serves as a journal for rotor 34'. Fluid enters along axis 30 and through openings 57 provided in end 56'. Outlet duct 58 leads to an outlet not shown.

In the embodiments so far illustrated the inner spherical surface 40 has about half the diameter of the outer spherical surface 37. If the lobes or teeth were continued all the way to apex 0, the volume displaced inside of surface 40 would be only one-eighth of the volume displaced inside of surface 37 of double diameter. With lobes having their inner ends at surface 40 the displacement is still ⅞ of the maximum displacement possible inside of surface 37, while a material advantage is gained in the production by cutting or grinding.

Figure 4:
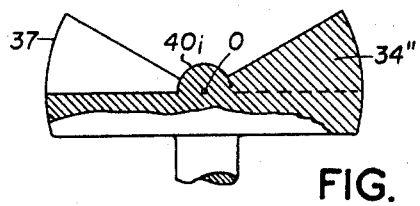
FIG. 4 is an axial section, partly a side view, of a rotor of modified design.

However when production is for instance by molding, coining or casting the production advantage is reduced and the inner spherical end surface may be diminished to almost nothing. FIG. 4 shows a rotor 34" so shaped. The inner spherical surface $40_1$ has less than half the radius of the outer spherical surface 37, and the knob containing surface $40_1$ is formed integral with rotor 34".

Proportionately small inner spherical surfaces may also be provided on rotors of large size, and on rotors intended for extreme rotational speeds where the increased production cost is acceptable.

Figure 5:
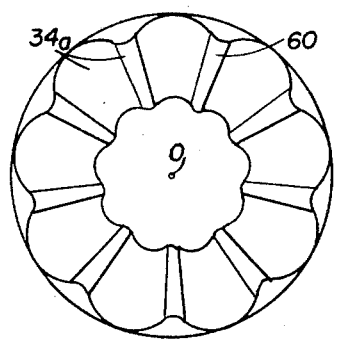
FIG. 5 is an axial view of a rotor constructed according to the present invention, looking at its face, showing its straight lobes or teeth directed towards its apex.

FIG. 5 is an axial end view of a rotor $34_a$ that may be used as rotor 34 in the described units. It has straight lobes or teeth 60 directed towards apex 0, at which the axes of the rotor pair intersect. The surface of its lobes is made up of straight-line elements, all passing through apex 0.

Figure 9:
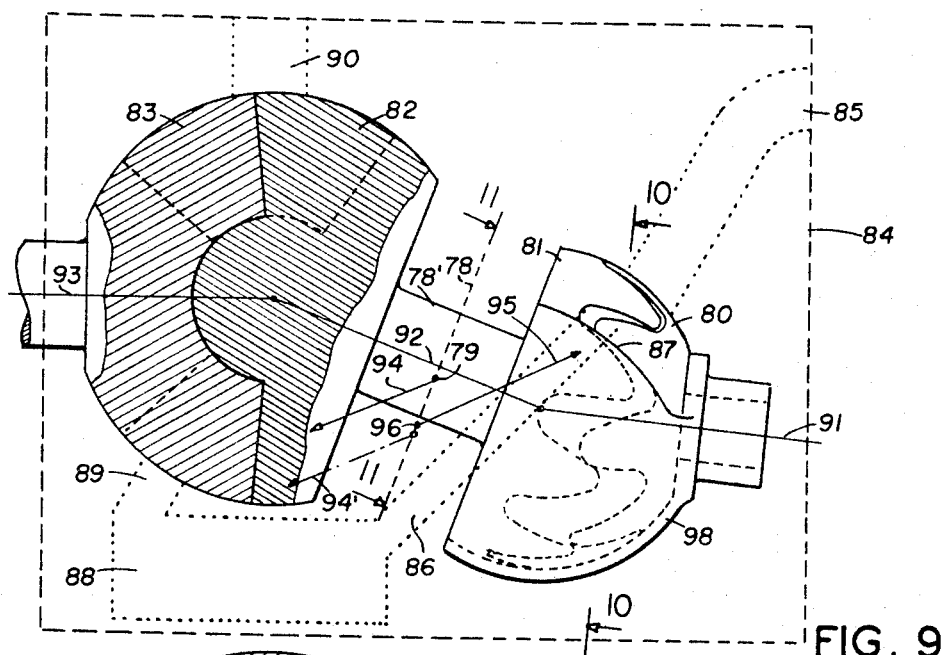
FIG. 9 is a diagrammatic view of a unit comprising a compressor and a motor or engine.

Diagram FIG. 9 shows a unit with two pairs of rotors 80, 81 and 82, 83 of different volumetric displacement rotatably mounted in a housing 84. It can be embodied as an engine unit or also as a cooling unit. In an engine unit the rotors 80, 81 are part of a compressor. Duct 85 admits air to the compressor. Duct 86 leads the compressed air to a combustion chamber diagrammatically indicated at 88. Duct 89 leads the combustion gas to the other pair of rotors 82, 83. An exhaust duct 90 leads the expanded combustion gas therefrom to the outside. One rotor of each pair has N teeth, while the other rotor of each pair has $N+1$ teeth.

The angularity of the rotational axes 91, 92 of rotors 80, 81 is smaller than the angularity of the axes 92, 93 of rotors 82, 83. Rotors 81, 82 have a common axis 92 and are rigid with each other. Furthermore the plane of the intersecting axes 91, 92 is preferably inclined to the plane of the intersecting axes 92, 93 to achieve improved pressure balance between the rotors 81, 82. The reason for this inclination will now be shown with FIGS. 11 and 12.

Figure 11:
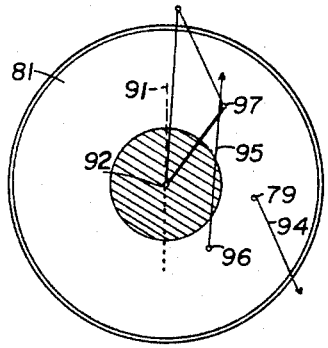
FIGS. 11 and 12 are diagrams illustrating the advantage obtained in inclining the plane of the axes of each of the two rotor pairs with respect to each other. They can be considered sections along lines 11—11 of FIG. 9, looking in the direction of the arrows.

FIG. 11 illustrates the load conditions when the axes 91, 92, 93 are all in one plane. The compressed air exerts a one-sided pressure on rotor 81. This pressure may be along an arrow 94 shown in both FIG. 9 and FIG. 11. It intersects the mid-plane 78 of shaft portion 78' at a point 79. A similar one-sided pressure is exerted on rotor 82. It may extend in the direction of arrow 95 that intersects plane 78 at 96. The length of the arrows are measures of the loads. The axial pressure components through points 79, 96 partly balance each other, but they also produce a turning moment in a plane parallel to axis 92 containing points 79, 96. The turning moment increases with increasing distance of the points 79, 96 from one another. The load components in mid-plane 78 can be combined to a resultant 92–97 (FIG. 11) which passes through axis 92 plus a turning moment about said axis. The turning moment is the difference of the turning moments exerted by the loads passing through the points 79, 96.

Figure 12:
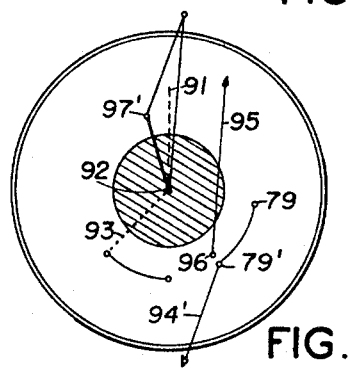

FIG. 12 shows the effect of a displacement of the plane of the axes 91, 92 about axis 92. Displacement is through an angle which moves point 79 to a position 79' close to point 96. The resultant load 92–97' in mid-plane 78 is slightly smaller than load 92–97. But the main gain lies in the sharp decrease of the turning moment exerted by the axial load components passing now through points 96, 79', because of the proximity of these points. Diagram FIG. 12 should be understood to correspond to the showing of FIG. 9.

The resulting turning moment about axis 92 is relatively small. The torque exerted on rotor 82 of the motor drives the compressor. Only a moderate portion thereof is transmitted through the lobe sides in the rotor pair 82, 83.

In operation the air is compressed in the rotor pair 80, 81 to a degree controlled by edge 87 (FIG. 9) of the outlet opening. This pressure is maintained in the combustion chamber, where combustion expands the volume of the gaseous fluid. The rotor pair 82, 83 thus requires a larger displacement volume, which is built into the diameter of the rotors and into the angularity of their axes.

When the amount of fuel injected into the combustion chamber is diminished under the design amount, the expansion through combustion decreases, and the pressure in the combustion chamber decreases. The compressed air then expands after leaving the compressor, increasing its volume, until the further increase in volume through combustion equals the volume displaced in the rotor pair 82, 83.

A gain in efficiency at reduced or changed engine load can be achieved by changing the outlet opening of the compressor for different loads, increasing the outlet area when fuel admission is decreased. This changes the pressure directly, without requiring expansion of the compressed air when leaving the compressor.

Figure 10:
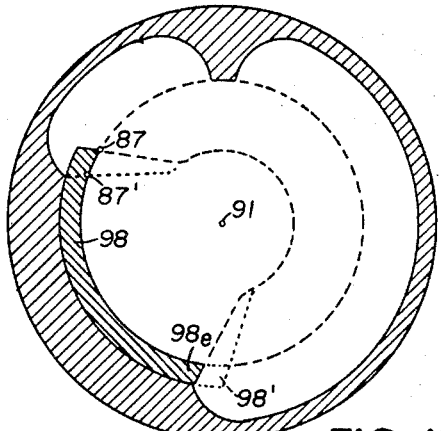
FIG. 10 is a diagrammatic section taken along line 10—10 of FIG. 9.

FIGS. 9 and 10 diagrammatically illustrate means for changing the outlet opening of the compressor. Edge 87 of the outlet opening is provided on a part 98 that can be angularly adjusted about axis 91 in dependence on the fuel admission. Dotted lines 98' show part 98 after adjustment for a decrease in compression and decrease in fuel admission. Edge 87 is then at 87'. The displacement of the opposite end $98_e$ has little effect on the performance, because there is practically no change in volume in that region.

Cooling of the hot parts may be provided in any suitable known way.

When the unit shown in FIG. 9 is embodied as a cooling unit, the larger rotor pair 82, 83 takes the incoming fresh air and compresses it. The air thereby heats up and is transmitted to a cooler, or broadly to a thermal part 88 for changing the temperature of the gaseous fluid. After cooling it is led to the rotors 80, 81 which now serve as a motor. As it expands therein the temperature drops to the level for which the unit was designed. A stream of cool fresh air leaves the unit.

While the invention has been described in connection with different embodiments thereof, it is capable of further modification and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A positive-displacement unit comprising two pairs of intermeshing rotors, housing means in which each pair is mounted to rotate on intersecting axes, the number of teeth of the rotors of each pair differing by one, one rotor of one pair having a common axis with one rotor of the other pair and being rigid therewith, a thermal chamber, a duct for leading gaseous fluid from one of said rotor pairs to said thermal chamber for changing the temperature of said fluid, and a duct for leading said fluid from said thermal chamber to the other of said rotor pairs.

2. A positive-displacement unit comprising two pairs of intermeshing rotors of different displacement, housing means in which each pair is mounted to rotate on intersecting axes, one rotor of one pair having a common axis with one rotor of the other pair and being rigid therewith, a thermal chamber, a duct for leading gaseous fluid from one of said rotor pairs to the thermal chamber for changing the temperature of said fluid, a duct for leading said fluid from said thermal chamber to the other of said rotor pairs, the rotor pair of larger displacement having a larger angularity of the axes.

3. A positive displacement unit comprising two pairs of intermeshing rotors of different displacement, housing means in which each pair is mounted to rotate on intersecting axes, one rotor of one pair having a common axis with one rotor of the other pair and being rigid therewith, a thermal chamber, a duct for leading gaseous fluid from one of said rotor pairs to said thermal chamber for changing the temperature of said fluid, a duct for leading said fluid from said thermal chamber to the other of said rotor pairs, the plane of the axes of one rotor pair being inclined to the plane of the axes of the other rotor pair.

4. A positive-displacement unit comprising two pairs of intermeshing rotors of different displacement, housing means in which each of said pairs is mounted to rotate on intersecting axes, one rotor of one pair having a common axis with one rotor of the other pair and being rigid therewith, the rotor pair of smaller displacement being part of a compressor, a duct for admitting air to said compressor, a combustion chamber, a duct for leading compressed air from said compressor to said chamber through an opening adjacent the periphery of the compressor rotors, means for changing said opening to control the compression ratio, a duct for leading combustion gas from said chamber to the other pair of rotors, and an exhaust duct for leading the expanded combustion gas from said other rotor pair ultimately to the outside.

5. A positive-displacement unit according to claim 1 comprising a pair of intermeshing rotors, a housing in which said pair of rotors is rotatably mounted on axes lying in a common plane, inlet and outlet ducts provided in said housing and leading to and from said intermeshing rotors, and means for changing the opening of at least one of said ducts.

6. A positive-displacement unit according to claim 5, wherein the means for changing said opening is a part movable about the axis of one of said rotors.

References Cited by the Examiner

UNITED STATES PATENTS

| | | | |
|---|---|---|---|
| 1,912,634 | 6/1933 | Gray | 123—12 |
| 3,101,700 | 8/1963 | Bowdish | 123—12 |

FOREIGN PATENTS

| | | |
|---|---|---|
| 464,475 | 4/1937 | Great Britain. |

MARK NEWMAN, *Primary Examiner.*

R. D. BLAKESLEE, *Assistant Examiner.*